United States Patent
Benitez et al.

(10) Patent No.: US 8,340,831 B2
(45) Date of Patent: Dec. 25, 2012

(54) NON-INTRUSIVE LOAD MONITORING SYSTEM AND METHOD

(75) Inventors: Diego Benitez, Pittsburgh, PA (US); Rui Huang, Glastonbury, CT (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/049,685

(22) Filed: Mar. 16, 2011

(65) Prior Publication Data

US 2011/0213739 A1 Sep. 1, 2011

Related U.S. Application Data

(63) Continuation-in-part of application No. 12/639,472, filed on Dec. 16, 2009, now Pat. No. 8,209,062.

(51) Int. Cl.
  *G05D 3/12* (2006.01)
  *G01R 21/06* (2006.01)
  *G01R 27/00* (2006.01)
(52) U.S. Cl. ............ 700/291; 702/60; 702/62; 702/65; 706/12
(58) Field of Classification Search ............... 700/291; 702/60, 62, 65; 706/12
  See application file for complete search history.

(56) References Cited

U.S. PATENT DOCUMENTS

| | | | |
|---|---|---|---|
| 4,858,141 A * | 8/1989 | Hart et al. | 702/61 |
| 5,337,013 A | 8/1994 | Langer et al. | |
| 5,483,153 A * | 1/1996 | Leeb et al. | 324/76.12 |
| 5,717,325 A | 2/1998 | Leeb et al. | |
| D458,864 S | 6/2002 | Keeler et al. | |
| 6,993,417 B2 | 1/2006 | Osann, Jr. | |
| 7,043,380 B2 | 5/2006 | Rodenberg, III et al. | |
| 7,409,303 B2 * | 8/2008 | Yeo et al. | 702/60 |
| 7,693,670 B2 * | 4/2010 | Durling et al. | 702/62 |
| 8,014,964 B1 * | 9/2011 | Khalsa | 702/60 |
| 2006/0036403 A1 | 2/2006 | Wegerich et al. | |
| 2009/0307178 A1 | 12/2009 | Kuhns et al. | |
| 2011/0004421 A1 * | 1/2011 | Rosewell et al. | 702/45 |

(Continued)

FOREIGN PATENT DOCUMENTS

WO 2011002735 A1 1/2011

(Continued)

OTHER PUBLICATIONS

Annual Energy Outlook, U.S. Department of Energy, http://www.eia.doe.gov/oiaf/aeo (12 pages).

(Continued)

*Primary Examiner* — Mohammad Ali
*Assistant Examiner* — Sivalingam Sivanesan
(74) *Attorney, Agent, or Firm* — Maginot, Moore & Beck

(57) ABSTRACT

In accordance with one embodiment, a system for non-intrusive load monitoring includes an output device, a data storage device including program instructions stored therein, a sensing device operably connected to a common source for a plurality of electrical devices, and an estimator operably connected to the output device, the data storage device, and the sensing device, the estimator configured to execute the program instructions to obtain data associated with a sensed state of the common source from the sensing device, obtain at least one model of each of the plurality of electrical devices, solve a Mixed Integer Programming problem for the at least one models over a fixed time horizon using the obtained data to determine a combination of operational stages of the plurality of electrical devices, and store operational data based on the solved Mixed Integer Programming problem.

20 Claims, 2 Drawing Sheets

U.S. PATENT DOCUMENTS

| | | | |
|---|---|---|---|
| 2011/0071885 A1* | 3/2011 | Ayres de Castro et al. | 705/10 |
| 2011/0144819 A1* | 6/2011 | Andrews et al. | 700/291 |
| 2011/0213739 A1 | 9/2011 | Benitez et al. | |

FOREIGN PATENT DOCUMENTS

| | | |
|---|---|---|
| WO | 2011084390 A1 | 7/2011 |

OTHER PUBLICATIONS

Ignacio E. Grossman, Jagadisan Viswanathan, Aldo Vecchetti; DICOPT, Engineering Research Design Center, Carnegie Mellon Univeristy, Pittsburgh, PA (21 pages).

G.W. Hart, Nonintrusive appliance load-monitoring, Proceedings of the IEEE, vol. 80, No. 12, pp. 1870-1891, 1992 (22 pages).

M.W. Hofbaur, B.C. Williams, Hybrid estimation of complex systems, IEEE Transactions on Systems, Man, and Cybernetics—Part B: Cybernetics, vol. 34, No. 5, pp. 2178-2191 (14 pages).

C. Laughman, K. Lee, R. Cox, S. Shaw, S. Leeb, L. Norford, P. Armstrong, Power signature analysis, IEEE Power and Energy Magazine, vol. 1, No. 2, pp. 56-63, 2003 (8 pages).

D. Parker, D. Hoak, A. Meier, R. Brown, How much energy are we using? Potential of residential energy demand feedback devices, Proc. Summer Study on Energy Efficiency in Buildings, 2006 (13 pages).

C.V. Rao, J.B. Rawlings, and D.Q. Mayne. Constrained state estimation for nonlinear discrete-time systems: Stability and moving horizon approximations. IEEE Trans. Auto. Cont., 48:246-258, 2003 (13 pages).

Gupta, S., Reynolds, M.S., Patel, S.N., "ElectriSense: Single-Point Sensing Using EMI for Electrical Event Detection and Classification in the Home", UBIComp 2010, 2010 (10 pages).

Baranski et al., "Genetic algorithm for Pattern Detection in NIALM Systems," IEEE International Conference on Systems, Man and Cybernetics, 2004, pp. 3462-3468, vol. 4, The Hague, The Netherlands (7 pages).

Chang et al., "Load Recognition for Different Loads with the Same Real Power and Reactive Power in a Non-intrusive Load-Monitoring System," 12th International Conference on Computer Supported Cooperative Work in Design, 2008, pp. 1122-1127, IEEE, Taiwan (6 pages).

Cox et al., "Transient Event Detection for Nonintrusive Load Monitoring and Demand Side Management Using Voltage Distortion," Applied Power Electronics Conference and Exposition, 2006, APEC '06, Twenty-First Annual IEEE, USA (7 pages).

Farinaccio et al., "Using a pattern recognition approach to disaggregate the total electricity consumption in a house into the major end-uses," Energy and Buildings, Aug. 1999, pp. 245-259, vol. 30, No. 3, Canada (15 pages).

Fischer, "Feedback on household electricity consumption: a tool for saving energy?," Energy Efficiency, 2008, pp. 79-104, vol. 1, No. 1, Berlin, Germany (26 pages).

Lam et al., "A Novel Method to Construct Taxonomy of Electrical Appliances Based on Load Signatures," Consumer Electronics, IEEE Transactions, May 2007, pp. 653-660, vol. 53, No. 2, Hong Kong SAR, China (8 pages).

Laughman et al., "Power Signature Analysis, IEEE Power and Energy Magazine," Mar./Apr. 2003, pp. 56-63, vol. 1, No. 2, USA (17 pages).

Luo et al., "Monitoring HVAC Equipment Electrical Loads from a Centralized Location—Methods and Field Test Results," ASHRAE Transactions: Symposia, 2002, pp. 841-857, vol. 108, No. 1, USA (17 pages).

Norford et al., "Non-intrusive electrical load monitoring in commercial buildings based on steady-state and transient load-detection algorithms," Energy and Buildings, 1996, pp. 51-64, vol. 24, Cambridge, MA (14 pages).

Paris, "A framework for non-intrusive load monitoring and diagnostics", Thesis, Massachusetts Institute of Technology, 2006. Thesis M. Eng.—Massachusetts Institute of Technology, Dept., Electrical Engineering and Computer Science, 2006 (206 pages).

Prudenzi, "A Neuron Nets Based Procedure for Identifying Domestic Appliances Pattern-of-Use from Energy Recordings at Meter Panel," Power Engineering Society Winter Meeting, IEEE, 2002, pp. 941-946, vol. 2, Italy (6 pages).

Shaw et al., "Nonintrusive Load Monitoring and Diagnostics in Power Systems", IEEE Transactions on Instrumentation and Measurement, 2008, pp. 1445-1454, vol. 57, No. 7, USA (10 pages).

Srinivasan et al., "Neural-Network-Based Signature Recognition for Harmonic Source Identification," IEEE Transactions on Power Delivery, Jan. 2006, pp. 398-405, vol. 21, No. 1, Singapore (8 pages).

Wichakool et al., "Resolving Power Consumption of Variable Power Electronic Loads Using Nonintrusive Monitoring," Power Electronics Specialists Conference, 2007, pp. 2765-2771, Cambridge, MA (7 pages).

International Search Report and Written Opinion in corresponding PCT application (i.e., PCT/US2012/029256), mailed May 7, 2012 (13 pages).

Yu Yi-Xin et al: "Non-intrusive method for on-line power load decomposition", 2008 China International Conference on Electricity Distribution (CICED 2008), IEEE, Piscataway, NJ, USA, Dec. 10, 2008, pp. 1-8, XP002628133, DOI: 10.1109/CICED.2008.5211781.

Kosuke Suzuki et al: "Nonintrusive appliance load monitoring based on integer programming", SICE Annual Conference, 2008, IEEE, Piscataway, NJ, USA, Aug. 20, 2008, pp. 2742-2747, XP031351601, DOI: 10.1109/SICE.2008.4655131 ISBN: 978-4-907764-30-02.

Liu M B et al: "Reactive Power and Voltage Control in Distribution Systems with Limited Switching Operations", IEEE Transactions on Power Systems, IEEE Service Center, Piscataway, NJ, US, vol. 4, No. 2, May 1, 2009, pp. 889-899, XP011254641, ISSN: 0885-8950.

* cited by examiner

NON-INTRUSIVE LOAD MONITORING SYSTEM AND METHOD

CROSS-REFERENCE TO RELATED APPLICATIONS

This application is a continuation-in-part of U.S. application Ser. No. 12/639,472, filed Dec. 16, 2009, the entire contents of which are incorporated herein by reference.

TECHNICAL FIELD

This application relates generally to methods and apparatuses for monitoring energy consumption and for related operations and, more specifically, for monitoring of energy consumption of devices in buildings.

BACKGROUND

The price and consumption of energy throughout the world has been increasing dramatically over recent years and is expected to continue along this trend in the years to come. According to a 2008 U.S. Department of Energy Annual Energy Outlook, residential energy consumption is expected to increase by approximately one percent per year for the next 20 years while energy prices slowly rise (see, Annual Energy Outlook, US Department of Energy, http://www.eia.doe.gov/oiaf/aeo/). Residential-related carbon dioxide emissions are also expected to increase. These trends clearly indicate the need for building technology solutions that lessen energy consumption.

To achieve lower energy consumption, existent appliances or devices can be replaced with more energy efficient alternatives, building occupants or owners can alter their behavior to reduce the use of energy-consuming devices, and automated building management solutions can control the operation of devices in the building so as to achieve less energy consumption or schedule operation for non-peak demand periods to reduce energy costs. All of these approaches are most effective when based on detailed knowledge of the amount of energy consumed by devices currently in the building and periods of operation of the devices. Such knowledge allows informed decisions as to how to reduce energy consumption. A major source of knowledge is available by monitoring energy consumption.

A number of systems exist for measuring energy consumption in a building and reporting this to users. See, for example, D. Parker, D. Hoak, A. Meier, R. Brown, "How much energy are we using? Potential of residential energy demand feedback devices", *Proc. Summer Study on Energy Efficiency in Buildings*, 2006. Many known systems only report the total amount of electricity consumption for the entire building. To obtain truly detailed information that is most useful in determining how to achieve energy savings, the effect of individual devices on the total amount of energy consumption is needed. Most current systems, however, lack any disaggregated reporting of the overall consumption and use-patterns of individual devices and appliances. Some exceptions are systems that use separate measurement devices to measure the electricity consumption of, for example, a sub-circuit of the building, an individual wall outlet or even an individual device itself. Systems of this type, however, require a large number of meters and are both costly and cumbersome to install.

An alternative approach to obtaining information associated with energy consumption of discreet devices is the use of nonintrusive appliance load monitoring. Non-Intrusive Load Monitoring (NILM) derives its name from the fact that, the technique allows some level of individual load monitoring in a building without intruding (e.g., placing sensors or other devices) into the building. This general approach, also referred to as NIALM (Non-Intrusive Appliance Load Monitoring), has been studied extensively by researchers around the world, yielding promising results. Various approaches are disclosed in U.S. Pat. No. 4,858,141, issued to Hart et al., and C. Laughman, et al., "Power signature analysis", *IEEE Power and Energy Magazine*, vol. 1, no. 2, pp. 56-63, 2003. More information on this type of approach is also available in U.S. Pat. No. 5,483,153 issued to Leeb, et al., U.S. Pat. No. 7,043,380 issued to Rodenberg, et al, U.S. Pat. No. 6,993,417 issued to Osann, Jr., U.S. Pat. No. 5,337,013 issued to Langer et al., U.S. Pat. No. 5,717,325 issued to Leeb, et al., and U.S. Pat. No. 6,993,417 issued to Osann, Jr. The usefulness of the approaches disclosed in the foregoing sources in real world building environments which have numerous devices operating in parallel has been minimally studied.

One publication, G. W. Hart, "Nonintrusive appliance load monitoring", *Proceedings of the IEEE*, 80(12): 1870-1891, 1992, describes a method for utilizing normalized real and reactive power ("P" and "Q", respectively) measurements from a main electrical feed of a residential building in NILM. In the disclosed approach, steady state power metrics (i.e., disregarding any transient, non-stable state) are used to describe in a distinct way the power draw of a number of home appliances. In other words, when an individual appliance changes state, for example from "off" to "on", a unique change in the total P and Q of the house occurs. Hart referred to these changes as the appliance's "signature", and described methods for correcting possible overlaps in the signature space by making use of appliance state transition models (e.g., an appliance cannot go from "off" to "on" and then again to "on").

Leslie K. Norford and Steven B. Leeb, "Non-intrusive electrical load monitoring in commercial buildings based on steady-state and transient load-detection algorithms", *Energy and Buildings*, 24(1):51-64, 1996, reported an improvement on Hart's "signature" technique which incorporated analysis of the startup transients of appliances coupled with the use of better algorithms for detecting when state transitions have occurred. See, also, Dong Luo, et al., "Monitoring HVAC equipment electrical loads from a centralized location—methods and field test results", *ASHRAE Transactions*, 108 (1):841-857, 2002.

C. Laughman, et al., "Power signature analysis", *Power and Energy Magazine*, IEEE, 1(2):56-63, 2003, describes how the use of current harmonics can improve the process even further, allowing for the detection and classification of certain continuously variable loads. W. Wichakool, et al., "Resolving power consumption of variable power electronic loads using nonintrusive monitoring", *Power Electronics Specialists Conference*, 2007, PESC 2007. IEEE, pages 2765-2771, 2007 presents further improvements to a solution for the problem of variable power electronics by using a spectral estimation method and a switching function technique. A summary and presentation of the achievements in this line of work can be found in S. R. Shaw, et al., "Nonintrusive load monitoring and diagnostics in power systems", *Instrumentation and Measurement*, IEEE Transactions, 57(7): 1445-1454, 2008.

Other research has focused on utilizing NILM for monitoring the health of large appliances, by carefully analyzing any changes to startup transients and associated signatures as detailed by James Paris, "A framework for non-intrusive load monitoring and diagnostics", *Thesis, Massachusetts Institute of Technology*, 2006, Thesis M. Eng.—Massachusetts Institute of Technology, Dept. of Electrical Engineering and Computer Science, 2006, R. Cox, et al., "Transient event detection for nonintrusive load monitoring and demand side management using voltage distortion", *Applied Power Electronics Conference and Exposition*, 2006, APEC '06, Twenty-First Annual IEEE, page 7, 2006, and Leslie K. Norford and Steven B. Leeb, "Non-intrusive electrical load monitoring in commercial buildings based on steady-state and transient load-detection algorithms", *Energy and Buildings,* 24(1):51-64, 1996.

Some efforts have been made to eliminate the need for a separate event detector. In one approach, a Kalman Filter is used to solve combinatorial Kalman Filter problems for each device in a building to determine the operational status of devices in a building. As the number of devices in the building increases, however, the complexity of such an approach increases hyperbolically. Moreover, such approaches incur some inaccuracy because only a small amount of output information is considered.

Efforts have also been made towards eliminating the need to collect current readings by inferring these from pure voltage measurements as reported by R. Cox, et al., "Transient event detection for nonintrusive load monitoring and demand side management using voltage distortion", *Applied Power Electronics Conference and Exposition,* 2006, APEC '06, Twenty-First Annual IEEE, page 7 pp., 2006. Other efforts have focused on methods for identifying an operating appliance that do not require an appliance to change from one state to the other. Rather, appliance operation is detected during operation of the appliance. See, e.g., D. Srinivasan, et al., "Neural-network-based signature recognition for harmonic source identification", *Power Delivery, IEEE Transactions,* 21(1):398-405, 2006.

S. Gupta, et al., "ElectriSense: Single-Point Sensing Using EMI for Electrical Event Detection and Classification in the Home", *Ubicomp* 2010, have also proposed the use of the high frequency electromagnetic interference for automatically detecting and classifying the use of electronics devices in the home.

There are also a growing number of research projects that have explored different classification algorithms and feature extraction methods. Neural networks have been used as reported by A. Prudenzi, "A neuron nets based procedure for identifying domestic appliances pattern-of-use from energy recordings at meter panel", *Power Engineering Society Winter Meeting,* 2002, IEEE, volume 2, pages 941-946 vol. 2, 2002, and more recently by Hsueh-Hsien Chang, et al., "Load recognition for different loads with the same real power and reactive power in a non-intrusive load-monitoring system", 12*th International Conference on Computer Supported Cooperative Work in Design* 2008, pages 1122-1127, IEEE, April 2008.

Genetic algorithms and clustering approaches have also been applied to data acquired from utility meters using an optical sensor as reported by M. Baranski and J. Voss, "Genetic algorithm for pattern detection in NIALM systems", *Systems, Man and Cybernetics,* 2004 *IEEE International Conference*, volume 4, pages 3462-3468 vol. 4, The Hague, The Netherlands, 2004, IEEE. A rule based system was developed to solve the disaggregation problem as reported by Linda Farinaccio and Radu Zmeureanu, "Using a pattern recognition approach to disaggregate the total electricity consumption in a house into the major end-uses", *Energy and Buildings,* 30(3):245-259, August 1999. An attempt to create a general taxonomy for appliance signatures is presented by H.Y. Lam, et al., "A novel method to construct taxonomy electrical appliances based on load signatures", *Consumer Electronics, IEEE Transactions,* 53(2) pp. 653-660, 2007, wherein use of clustering techniques and a novel feature set enabled the researchers to identify common traits in the signatures of same-type appliances commonly found in modern residential buildings.

Despite almost two decades of research in the area, techniques for non-intrusively disaggregating the total electrical load of buildings remain in the hands of researchers and have not yet been adopted by society in general. Even though the list of publications in the field is currently large, and still growing, the number of commercial products incorporating some form of NILM, such as "Enetics SPEED" commercially available from Enetics, Inc. of Victor, N.Y., is very limited. One reason for the lack of widespread commercial availability is that previous approaches have relied on custom hardware to monitor the power lines. Typically, these solutions have been very expensive, although recent advances have lowered the cost.

Commercially feasible products which have traditionally relied upon event detection approaches have been further limited by the level of unwanted noise present in the electrical distribution system of modern buildings. Attempts to detect events (e.g., appliance state transitions) in these settings prove to be much harder which makes accuracy more difficult to achieve. Additionally, there is little research showing test results involving modern real world buildings, and even less experimentation addressing the possible energy savings that the approaches could bring in the short, medium, or long term. Thus, commercial motivation for obtaining these products has not been fostered.

Another reason that NILM technology has not progressed from research to development may be a fear that the data derived from NILM would simply be ignored and not be used to modify energy consumption behavior. New research, such as that reported by Corinna Fischer, "Feedback on household electricity consumption: a tool for saving energy?", *Energy Efficiency,* 1(1), pp. 79-104, February 2008; however, indicates that real-time, continuous, appliance-level information may be the most effective way to motivate behavior change.

Training the algorithms used in NILM systems has also been an obstacle for wide adoption of the systems. In order for the algorithms to learn how to correctly classify signatures of appliance state transitions, a number of examples must be presented to them. One approach to training algorithms is by having a user manually switch appliances on and off while the monitoring device is in a training mode. This approach is very cumbersome and, in some applications, simply not feasible.

Accordingly, there is a need for improved methods and apparatuses for monitoring energy consumption and for related operations. A system and method that addressed any of the foregoing problems would be beneficial. A system and method that provides data that can be used to raise energy consumption awareness of users would be beneficial. A system and method that non-intrusively monitors a load without the need for an event detector and which directly accounts for the physical dynamics inherently associated with each appliance would be further beneficial.

SUMMARY

In accordance with one embodiment, a system for non-intrusive load monitoring includes an output device, a data storage device including program instructions stored therein, a sensing device operably connected to a common source for a plurality of electrical devices, and an estimator operably connected to the output device, the data storage device, and the sensing device, the estimator configured to execute the program instructions to obtain data associated with a sensed state of the common source from the sensing device, obtain at least one model of each of the plurality of electrical devices, solve a Mixed Integer Programming problem for the at least one models over a fixed time horizon using the obtained data to determine a combination of operational stages of the plurality of electrical devices, and store operational data based on the solved Mixed Integer Programming problem.

In a further embodiment, a method for non-intrusive load monitoring includes sensing a state of a common source for the plurality of electrical devices from a sensing device, obtaining at least one model of each of the plurality of electrical devices, solving a Mixed Integer Programming problem for the at least one models over a fixed time horizon using the sensed state to determine a combination of operational stages of the plurality of electrical devices, and storing operational data for the plurality of electrical devices based upon the determined combination of operational stages.

DETAILED DESCRIPTION

Figure 1:
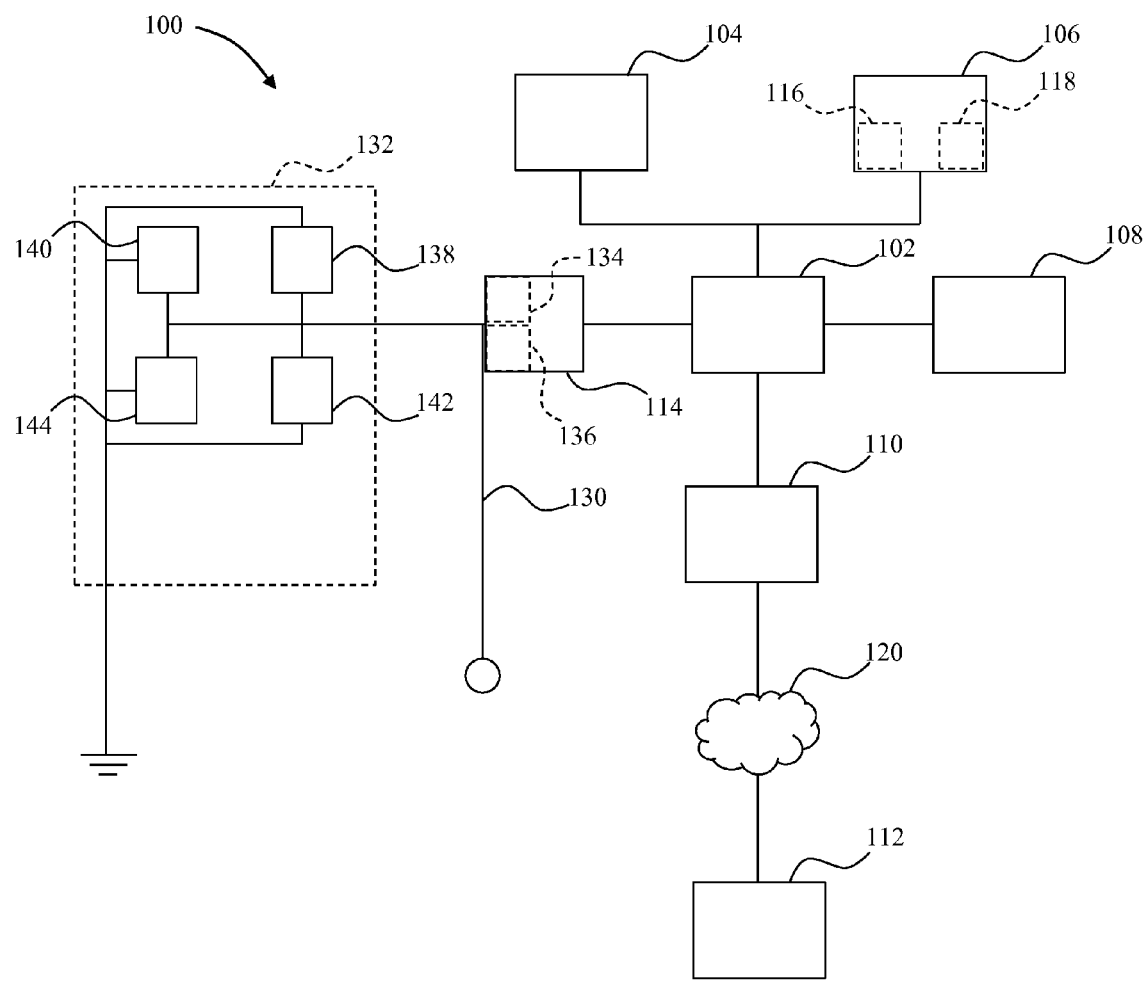
FIG. 1 is a schematic view of a non-intrusive load monitoring system that is configured to identify the operational state of a plurality of electrical devices located within a building.

For a general understanding of the details for the systems and processes disclosed herein, the drawings are referenced throughout this document. In the drawings, like reference numerals designate like elements.

The term "user interface" refers to the components and processes used by a non-intrusive load monitoring system to present information to one or more occupants of a building or users of the system. User interfaces may present information to users in various formats, including graphics, text, audible messages, and haptic feedback. The user may control the user interface using multiple techniques including mechanical controls, voice controls, touch-screen interfaces, and the like.

FIG. 1 depicts a schematic diagram of a non-intrusive load monitoring system 100. The non-intrusive load monitoring system 100 includes an estimator which can be running in an embedded computer or controller 102, random access memory (RAM) 104, non-volatile data storage device 106, input/output (I/O) device 108, and a network interface 110. The non-intrusive load monitoring system 100 further includes a remote device 112 and sensor device 114.

The estimator 102 is an electronic processing device such as a microcontroller, application specific integrated circuit (ASIC), field programmable gate array (FPGA), microprocessor including microprocessors from the x86 and ARM families, or any electronic device configured to perform the functions disclosed herein. Estimator 102 may implement software and hardware functional units including a graphical processing unit (GPU) for generation of visual display data, as well as an audio digital signal processor (DSP) for generation of audible output signals. Estimator 102 is configured to execute instructions corresponding to one or more software programs as discussed more fully below.

RAM 104 may be embodied by any memory device that enables the estimator 102 to load and store data from the memory device in a random access manner. Example embodiments include dynamic RAM (DRAM) and static RAM (SRAM). RAM 104 is operatively coupled to the estimator 102 and estimator 102 may load and store program instructions and data in the RAM 104. In a typical embodiment, the RAM 104 is volatile, meaning that contents of the RAM 104 are erased in the absence of electric power.

Non-volatile data storage device 106 may be implemented as a hard drive, solid state drive, or as any digital storage device that is configured to retain data in the absence of externally supplied electrical power. Data storage device 106 is operatively coupled the estimator 102. Data storage device 106 reads stored data and provides the data to the estimator 102, and writes data in response to a write command from the estimator 102.

The data storage device 106 is configured to hold one or more stored programs 116 and stored data 118. Stored programs 116 include executable code to implement an operating system and one or more user space programs that execute within the operating system. Additional detail regarding the stored programs 116 is provided below.

Stored data 118 include various data files for use by one or more stored programs in operation. The stored data 118 contain one or more sets of configuration data that define the format of user interfaces for the programs in the stored program data 116. The configuration data may include CSS and XSLT files that define rules for generating a user interface. Additional detail regarding the stored data 118 is provided below.

The I/O device 108, while shown as a single device, may be a number of different devices. Moreover, one or more I/O devices may be collocated with the x estimator 102 or located remotely from the estimator 102. The I/O device 108 may include a visual display device, such as a liquid crystal display (LCD), organic light-emitting diode (OLED) display, or projection device. The I/O device 108 may further include one or more speakers. The I/O device 108 is further configured to generate signals in response to a user action, and to provide the generated signals to the estimator 102. To this end, the I/O device may include one or more of buttons, knobs, dials, switches, sliders, keypads, touch-screen devices, and audio input devices.

The I/O device 108 may be implemented as a wired connection using a standard connection type such as the Universal Serial Bus (USB) or various other wired connection standards. The I/O device 108 may also include a wireless port that enables communication with an electronic device through a wireless protocol including the 802.11 WLAN, Zigbee and Bluetooth protocols. The I/O device 108 may thus enable various electronic devices to communicate with the estimator 102 including diagnostic equipment and electronic devices carried by an operator or user of the non-intrusive load monitoring system 100. In one embodiment, the I/O device 108 is a handheld communication device carried by a user, such as a smart phone that includes communication hardware and software for communicating with the estimator 102.

The network interface 110 is operatively coupled to the estimator 102 and enables the estimator 102 to send and receive data using one or more digital networks. In a typical embodiment, the network interface 110 implements a wireless networking protocol that enables the estimator 102 to send and receive data using external data networks 120. Examples of suitable wireless networks include 3G and 4G cellular data networks, satellite based communication networks, any suitable wireless wide area networks (WWANs), wireless local area networks (WLANs) including IEEE 802.11 wireless networks, and any wireless data transmission standard appropriate for use in the non-intrusive load monitoring system 100. The estimator 102 may be configured to send and receive data packets using an Internet Protocol (IP) based protocol using, for example, either IP version 4 or IP version 6, common connection layer protocols including the Transport Control Protocol (TCP) and User Datagram Protocol (UDP), and a plurality of application level protocols.

The network interface 110 allows the estimator 102 to communicate with the remote devices 112. In different embodiments, some or all of the functions provided by the estimator 102, the data storage device 106, RAM 104, I/O device 108, and sensor device 114 may be performed by one or more remote devices 112.

The sensor device 114 is positioned such that power provided by a power source 130 to a building 132 may be sensed. Characteristics of the power source 130 that may be sensed by the sensor device 114 include current, voltage, real power, reactive power, a harmonic of the real power, and a harmonic of reactive power. To this end, sensors such as voltmeter 134 and current meter 136 may be provided in the sensor device 114. The sensor device 114 may include other sensors such as, for example, environmental sensors.

The sensor device 114, while depicted as a single unit in FIG. 1, may be provided in the form of a number of different units in other embodiments. In alternative embodiments a number of sensors 114 may be positioned within the building 132, each sensor positioned to sense the power provided by the power source 130 to a respective room, area, or group of electrical devices. In the embodiment of FIG. 1, however, the sensor device 114 is located outside of the building 132 so as to sense the power provided by the power source 130 to each of electrical devices 138, 140, 142, and 144 regardless of the location of the electrical devices 138, 140, 142, and 144 within the building.

The electrical devices 138, 140, 142, and 144 may be any type of electrical device which requires power to operate. Each of the electrical devices 138, 140, 142, and 144 may each be different from the other of the electrical devices 138, 140, 142, and 144, or two or more may be the same type. The electrical devices 138, 140, 142, and 144 may be "single phase" electrical devices or "multi-phase" electrical devices.

A "single phase" device is one which has a single output for a single input. By way of example, an incandescent light bulb with a simple "on-off" switch is "on" for one switch position and "off" for the other switch position. Because a single output is realized for a given switch position, the light bulb and switch are a linear system. The same incandescent light bulb attached to a dimmer switch can also be "on" or "off". When the dimmer switch is "on", however, a variable amount of power may be used depending upon the selected brightness. Thus, in systems including an "on-off" switch along with a variable resistance slider, a single switch position may result in multiple different power usages. Because multiple outputs are realized for a given on-off switch position, the light bulb and dimmer switch are a multi-phase system.

One or more of the electrical devices 138, 140, 142, and 144 may also be "multistage" electrical devices. A multistage electrical device is a device that progresses through a particular sequence. One example of a multistage device is a washing machine. The washing machine may progress through a fill cycle, a wash cycle, a spin cycle, a rinse cycle, and a final spin cycle. Each of the cycles uses a different amount of power. Each cycle can thus be described as a stage.

In the non-intrusive load monitoring system 100, a model of each of the electrical devices 138, 140, 142, and 144 is stored within the stored data 118 of the data storage 106. Each model is a state-space representation of the associated electrical device. A "state-space representation" consists of two "equations". The two equations are called a "State Equation" and an "Output Equation" which are represented below for a linear system:

$$x_i(k+1) = A_i x_i(k) + B_i u_i(k) \quad \text{(State Equation)}$$

$$y_i(k) = C_i x_i(k) + D_i u_i(k) \quad \text{(Output Equation)}$$

wherein

"k" is time at a discrete moment (e.g., the sampling time), the subscript "i" represents a particular electrical device, "$x_i(k)$" is the condition of the device "i" at the discrete moment (k), "$u_i(k)$" is the input to the device "i" at the discrete moment (k), "$y_i(k)$" is the output of the device "i" that is measurable by the sensor device 114 at the discrete moment (k), and "A", "B", "C", and "D" are matrix values.

Because the output in the electrical devices 138, 140, 142, and 144 exhibits a shift in time when the input is shifted in time, the electrical devices 138, 140, 142, and 144 are referred to as time invariant. That is, a time shift in the input signal results in a corresponding time shift in the output. This is reflected in the foregoing equations by the use of the letter "k" rather than the letter "t" for "time".

In the foregoing equations, matrix A is a system matrix, and relates how the current state affects the state change at a future time interval. Matrix B is a control matrix, and determines how the system input affects the state change. Matrix C is an output matrix, and determines the relationship between the system state and the system output. Matrix D is a feed-forward matrix, and allows for the system input to affect the system output directly.

For non-linear time invariant systems, the State Equation and Output Equation are represented as follows:

$$x_i(k+1) = f_i(x_i(k), u_i(k)) \quad \text{(State Equation)}$$

$$y_i(k) = h_i(x_i(k), u_i(k)) \quad \text{(Output Equation)}$$

wherein

"f" and "g" are non-linear functions which describe the dynamics of the system.

The models for the electrical devices 138, 140, 142, and 144 may be populated into the data storage 106 in any desired fashion. In some embodiments, electrical device models may be provided with one or more of the electrical devices 138, 140, 142, and 144 and stored as the electrical devices 138, 140, 142, and 144 are obtained. In other embodiments, the estimator 102 may access a remote device 112 using the network interface 110 to obtain such a model stored in the remote device 112.

In yet another embodiment, the estimator 102 executes a stored program 116 to learn a model for an electrical device. By way of example, the estimator may be used to obtain signals from the sensor device 114 while an electrical device, such as electrical device 138 for purpose of this example, is changed from an "off" condition to an "on" condition. In the event that the sensor device 114 is monitoring voltage and current of the power source 130, the estimator 102 executes a stored program 116 to generate a model wherein for a given input voltage to the electrical device 138, the observed change in current in the power source 130 is the output of the model. In the event that the electrical device 138 is a multiphase device, a separate model may be generated for each of the phases. Similarly, an electrical device which exhibits different characteristics based upon other factors can have a different model for each condition. For example, a device may have a different output when it is cold as opposed to warm, or a washing machine may have a different signature for a spin cycle when it is fully loaded compared to when it is partially loaded.

Figure 2:
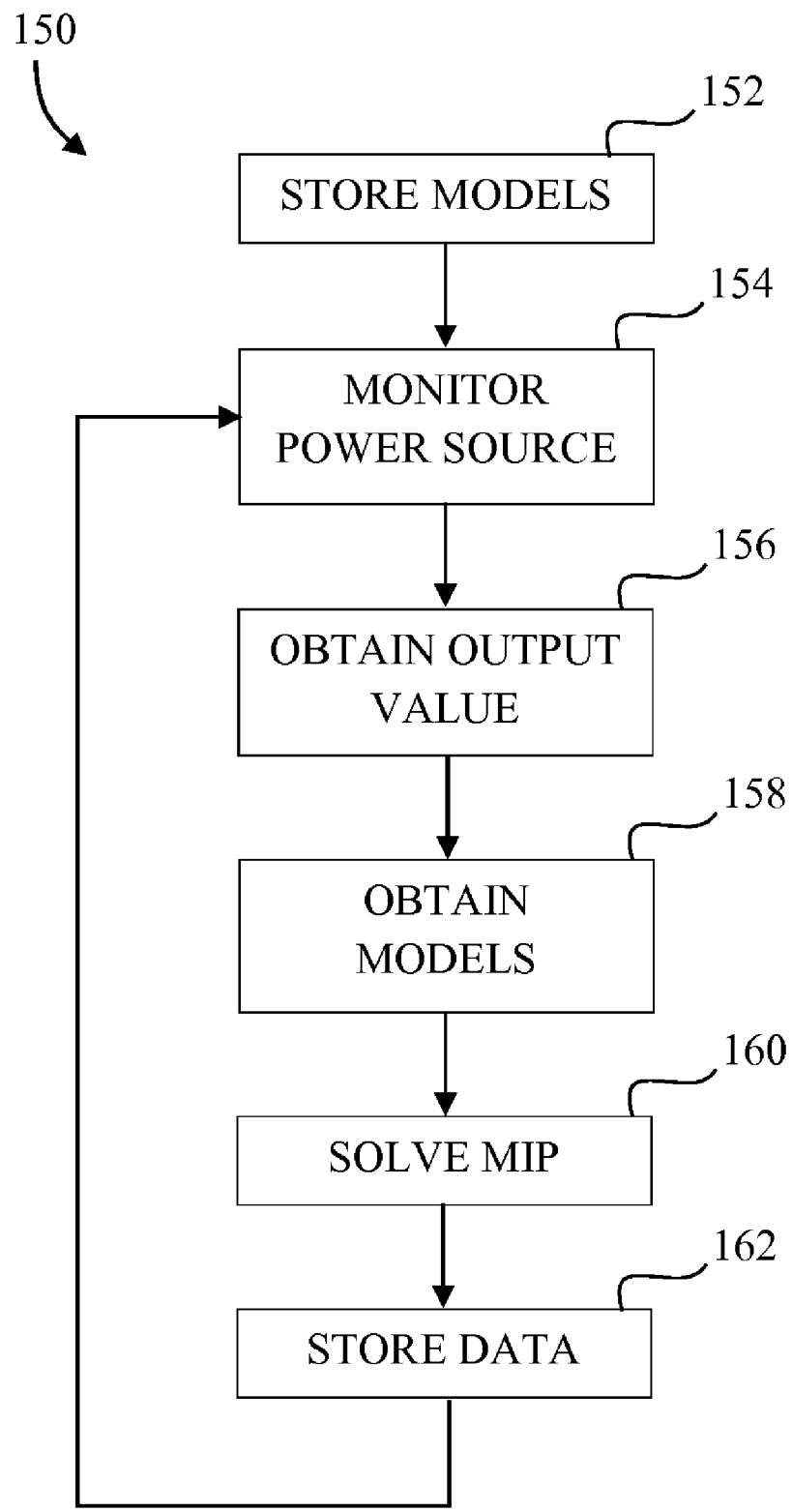
FIG. 2 is a block diagram of a process for non-intrusively monitoring operation of electrical devices in a building.

The non-intrusive load monitoring system 100 may be operated as described in reference to a procedure 150 of FIG. 2. At block 152, a model for each of the electrical devices 138, 140, 142, and 144 (more or fewer devices may be present in different embodiments) is stored in the stored data 118 of data storage 106. The estimator 102 then controls the sensor device 114 to monitor the power source 130 (block 154). At a given periodicity, the estimator 102 obtains a measured output from the sensor device 114 (block 156). Using a simple system wherein current flow is the measured output of the electrical devices, the measured output is the total current flow through the power source 130.

At block 158, the estimator 102 obtains the models that were stored at block 152. The estimator 102 then solves a discrete optimization problem such as the minimization or maximization of an objective function subject to constraints, which can be formulated as a Mixed Integer Programming (MIP) problem using the output value and the models (block 160). In other words, the estimator 102 optimizes the combination of inputs ($u_i(k)$) for all of the electrical devices in the system such that the summation of all of the models best reflects the obtained output value from block 156. This is represented by the following optimization equation:

$$\min \sum_{k=1}^{h} \left( \sum_{i=1}^{n} u_i(k) y_i(k) - \bar{y}(k) \right)^2$$

wherein

"n" is the total number of electrical devices (four in the embodiment of FIG. 1), "$\bar{y}$" is the measured output (from block 156), and "h" is horizon length.

In order to simplify solving the optimization equation, additional constraints may be included in the optimization equation. Constraints may take a variety of forms. For example, a maximum energy consumption for an electrical device may be one constraint. Another constraint would be that multiple stages of a multistage device cannot be operating at the same time (e.g., a washing machine cannot be in a spin cycle and a fill cycle at the same time). Some exemplary constraints are in the following form:

subject to (s. t.)

$x_i(k+1) = f_i(x_i(k), u_i(k))$ $y_i(k) = h_i(x_i(k), u_i(k)), i=1, \ldots n, k=1, \ldots h$ $u_i(k) \in 0, 1$ $g_1(x_i(k), y_i(k)) \leq 0, i=1, \ldots n, k=1, \ldots h$ $g_2(u_i(k)) \leq 0, i=1, \ldots n, k=1, \ldots h$ In the foregoing constraints, "$g_1$" may be the maximum power consumption of device "i" and "$g_2$" may constrain two different devices (or phases) from simultaneous operations.

Any desired solver may be stored within the data storage 106 for use in solving the MIP problem. In the event that one or more of the electrical devices is a non-linear device, then the optimization problem is a mixed integer nonlinear programming (MINLP) problem. A variety of solvers are available for MINLP problems. Some commercially available solvers include DICOPT and open source solvers like BON-MIN. Even if the functions "f" and "h" for a given device are linear, the optimization equation still becomes a MINLP problem because the term "$u_i(k)y_i(k)$" makes the equation non-convex.

While a local optimizer yields a global solution for a convex scenario, a local optimizer can only give a local optimal solution for non-convex scenarios. Nevertheless, use of a local solver is typically preferred since local solvers generally are able to solve more problems compared to global solvers. Additionally, a mixed integer linear programming (MILP) can be solved orders of magnitude faster than MINLP using currently available software, a significant benefit when implementing the process 150 in real time. Accordingly, resolution speed of the MIP problem may be increased by modifying MINLP optimization equations to be MILP optimization equations.

Modification of an MINLP optimization equation to an MILP optimization equation is accomplished by rewriting the foregoing MINLP optimization equation as follows:

$$\min \sum_{k=1}^{h} \left( \sum_{i=1}^{n} \omega_i(k) - \bar{y}(k) \right)^2$$

wherein "$w_i(k)$" is defined by the constraints:

s. t.

$-M(1-u_i(k)) \leq \omega_i(k) - y_i(k) \leq M(1-u_i(k))$ $-Mu_i(k) \leq \omega_i(k) \leq Mu_i(k)$ The immediately foregoing constraints imply that if $u_i(k)=1$ then $\omega_i(k)=y_i(k)$ and if $u_i(k)=0$ then $\omega_i(k)=0$. Thus, the additional constraints exactly model the logic $u_i(k)y_i(k)$. The modified MINLP equation, however, is a MILP equation.

By solving the MIP problem, preferably using MILP equations, a combination of the operational condition of the electrical devices 138, 140, 142, and 144 is determined which most closely reflects the output value obtained at block 158. The operational condition data is then stored in stored data 118 at block 162. The process then continues at block 154 and additional operational data is determined and stored.

The process 150 may continue for so long as the estimator 102 is operating. As the process 150 is continuing, or even after the process 150 has ceased, the operational condition data stored at block 162 may be used in a number of ways. By way of example, by setting the horizon of the equation to greater than one (the variable "h"), additional constraints can be implemented reflecting the manner in which the electrical devices 138, 140, 142, and 144 can physically operate over time. The additional constraints result in increased accuracy of the system 100.

One such implementation, with reference to the washing machine example above, the loop time of the process 150 may be fast enough that it is physically impossible for the washing machine to transition from a "final spin" cycle to a "wash" cycle over a single loop iteration. Accordingly, a determination at time k that the washing machine is in a final spin cycle may be used to establish a constraint at time k+1 that that the washing machine cannot be in a wash cycle.

The stored operational data may further be used to establish weightings which can be used in the optimization equation. By way of example, data as to the duration of a spin cycle may be included in the model of the washing machine. Subsequently, if at time k the washing machine is in a spin cycle, but has not been in the spin cycle for a full spin cycle duration, then at time k+1 the washing machine is most likely to still be in a spin cycle or "off". The washing machine is less likely to be in a "rinse" cycle.

While normal operating sequences may be stored based upon a generic model of an electrical machine, the model may further be modified by the estimator 102 to reflect habitual use patterns based upon stored operational data. Accordingly, the model may be updated by the estimator to reflect a pattern wherein a microwave is typically operated within 5 minutes of a coffee maker starting to reflect a pattern of an individual starting to make coffee and then making microwavable oatmeal. The patterns may be a combination of daily/weekly patterns and even patterns that are not repeated merely on a weekly basis.

The habitual use patterns can further be used in generating or updating a learned behavioral model. A behavioral model captures the pattern and timing of electrical device use. By analyzing the behavioral model, a user can be made aware of opportunities to modify behavior to reduce energy usage or costs. For example, the user may be informed that by modifying the time of day that a heat producing device is used so as to reduce heat generation during summer daylight hours, energy consumption can be reduced. The user may further be informed as to the amount or cost of energy that would be saved by behavior modification. In other applications, a recommendation to delay operation of a device to shift energy consumption to off-peak hours may be provided. The behavioral model may be stored in the data storage 106 or in a remote device 112. The estimator 102 may provide an output to the output device 108 for use by the owner or occupant of the building depicting the behavioral model as a bar chart, pie chart, etc. The behavioral model may also be used by a power company to assist in power plant planning.

By comparing the measured output to modeled outputs, the non-intrusive load monitoring system 100 may identify inconsistencies such as an unidentified output resulting either from incorporation of a new electrical device in the building 132 or from degradation of a monitored device. The estimator 102 may execute stored program instructions to perform a variety of actions in response to an identified inconsistency. The estimator 102 may access a remote device 112 and search for a model matching the newly sensed output. If a model matching the newly sensed output is found, the estimator 102 may issue an alert requesting a user to confirm the presence of the new device. A user may also be alerted to an inconsistency so that the user can "teach" the output associated with the new device to the estimator 102.

When an output is associated with a previously modeled device, but the sensed output is determined to have changed from the modeled output, in addition to modifying the stored model for the device, the estimator 102 may alert the user of the change so that maintenance on or replacement of the device may be scheduled. The alert may be provided on the I/O device 108, or on a remote device 112.

The non-intrusive load monitoring system 100 is thus capable of incorporating more complicated modeling methods (such as first principle models), other features related to appliances (higher order information) and inequality constraints to further improve the accuracy. Additionally, aspects of the estimation process can easily be used for applications such as learning of behavioral patterns in appliance use or monitoring performance degradation of devices.

Furthermore, the non-intrusive load monitoring system 100 accomplishes the foregoing and other benefits without the need for an event detector and directly accounts for the physical dynamics inherently associated with each appliance. For example, the non-intrusive load monitoring system 100 does not need to solve combinatorial Kalman Filter problems for each device and the system 100 provides the flexibility to incorporate longer time horizons so as to increase the estimation accuracy. The non-intrusive load monitoring system 100 also handles de-energization of an electrical device better than previous approaches. Specifically, the optimization approach described herein can model instantaneous transition of energy consumption to zero while state estimation approaches assume a short transition period which is a significant disturbance to the state estimation resulting in decreased accuracy.

Accuracy of the non-intrusive load monitoring system 100 is further enhanced since an estimate of the operational condition of each device is obtained for all points in the time horizon as determined by the sampling rate of the measurements or observations of the total load. In contrast, previous approaches perform analysis only when a probable appliance transition is detected. A more continuous optimization approach as disclosed herein allows for the estimator to modify the estimation during periods of slow transients that would be difficult for an event detector to observe.

Moreover, the described system may be easily modified to provide additional accuracy. For example, additional information such as the reactive energy consumption, higher order harmonics, and other characteristics of various appliances can easily be incorporated in the optimization framework to identify a more unique signature for each device.

Additionally, while the non-intrusive load monitoring system 100 was described herein as using a MIP approach in the context of a state-space model, the non-intrusive load monitoring system 100 may be modified to be used with other systems identification computational techniques. For example, the non-intrusive load monitoring system 100 may incorporate transfer functions or autoregressive modeling. In general, the MIP approach disclosed herein may be used with any model that allows a best fit analysis to be performed using MIP.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A system for non-intrusive load monitoring comprising:
   an output device;
   a data storage device including program instructions stored therein;
   a sensing device operably connected to a common source for a plurality of electrical devices; and
   an operably connected to the output device, the data storage device, and the sensing device, the estimator configured to execute the program instructions to
     obtain data associated with a sensed state of the common source from the sensing device,
     obtain at least one model of each of the plurality of electrical devices,
     solve a Mixed Integer Programming problem for the at least one models over a fixed time horizon using the obtained data to determine a combination of operational stages of the plurality of electrical devices, and
     store operational data based on the solved Mixed Integer Programming problem.

2. The system of claim 1, wherein the model for each of the plurality of electrical devices includes a state equation and an output equation.

3. The system of claim 2, wherein:
the plurality of electrical devices includes at least one non-linear electrical device; and
the non-linear electrical device is modeled as a linear system.

4. The system of claim 2, wherein the sensing device is configured to sense a voltage and a current of the common source.

5. The system of claim 2, wherein the sensing device is configured to sense one or more of a reactive energy and a high order harmonic.

6. The system of claim 2, wherein the sensing device is located remotely from the estimator.

7. The system of claim 2, further comprising:
at least one remotely located model data storage device, wherein the estimator is (i) operably connected to the at least one remotely located model data storage device, and (ii) configured to execute the program instructions to obtain at least one of the at least one model of each of the plurality of electrical devices from the at least one remotely located model data storage device.

8. The system of claim 2, wherein the estimator is further configured to execute the program instructions to:
automatically learn at least one of the at least one model of each of the plurality of electrical devices.

9. The system of claim 8, wherein the estimator is further configured to execute the program instructions to:
adaptively update the at least one of the at least one model of each of the plurality of electrical devices.

10. The system of claim 2, wherein:
at least one of the plurality of electrical devices is a multi-stage device; and
the estimator is configured to execute the program instructions to obtain a model for each of the multistage device phases.

11. The system of claim 2, wherein the Mixed Integer Programming problem comprises:
at least one logic constraint defining a relationship between a first of the plurality of electrical devices and a second of the plurality of electrical devices.

12. The system of claim 2, wherein the estimator is further configured to execute the program instructions to:
modify a behavioral model based upon the determined combination of operational stages.

13. The system of claim 2, wherein the estimator is further configured to execute the program instructions to:
generate an alert based upon the solved Mixed Integer Programming problem.

14. A method for non-intrusive load monitoring comprising:
sensing a state of a common source for the plurality of electrical devices from a sensing device;
obtaining at least one model of each of the plurality of electrical devices;
solving a Mixed Integer Programming problem for the at least one models over a fixed time horizon using the sensed state to determine a combination of operational stages of the plurality of electrical devices; and
storing operational data for the plurality of electrical devices based upon the determined combination of operational stages.

15. The method of claim 14, wherein the model for each of the plurality of electrical devices includes a state equation and an output equation.

16. The method of claim 15, wherein:
the plurality of electrical devices includes at least one non-linear electrical device; and
the non-linear electrical device is modeled as a linear system.

17. The method of claim 14, wherein obtaining at least one model comprises:
obtaining at least one of the at least one model of each of the plurality of electrical devices from at least one remotely located model data storage device.

18. The method of claim 14, further comprising:
modifying at least one of the at least one model of each of the plurality of electrical devices based upon the sensed state of the common source.

19. The method of claim 14, wherein obtaining at least one model comprises:
obtaining a model for each phase of a multiphase device.

20. The method of claim 14, further comprising:
modifying a behavioral model based upon the determined combination of operational stages.

* * * * *